United States Patent [19]
Dobias et al.

[11] 3,960,099
[45] June 1, 1976

[54] CAN TRIMMING APPARATUS

[75] Inventors: Robert M. Dobias, San Jose; Tibor Kmetz, Santa Clara; Walter C. Warnell, San Jose, all of Calif.

[73] Assignee: National Can Corporation, Chicago, Ill.

[22] Filed: Jan. 20, 1975

[21] Appl. No.: 542,127

[52] U.S. Cl................................. 113/7 R; 113/115
[51] Int. Cl.².......................................... B21D 51/26
[58] Field of Search.................... 113/7 R, 7 A, 115; 74/89, 84, 22 A

[56] References Cited
UNITED STATES PATENTS

| | | | |
|---|---|---|---|
| 2,191,806 | 2/1940 | Peyser et al. | 113/115 |
| 2,362,848 | 11/1944 | Pearson | 113/115 |
| 3,802,363 | 4/1974 | Langewis | 113/7 R |
| 3,838,653 | 10/1974 | Larkin et al. | 113/7 R |

*Primary Examiner*—Lowell A. Larson
*Attorney, Agent, or Firm*—James E. Anderson

[57] ABSTRACT

A loading apparatus for supplying container bodies to a mandrel forming part of a can trimming machine is disclosed herein. The loading apparatus consists of a plunger that is guided on the machine frame for axial movement towards and away from the mandrel and moved by a shaft having an arm extending radially therefrom with a link connecting the arm and the plunger. The shaft is rotated between angular extreme positions by a continuously driven cam member to oscillate the arm between positions and reciprocate the plunger towards and away from the mandrel.

4 Claims, 3 Drawing Figures

CAN TRIMMING APPARATUS

BACKGROUND OF THE INVENTION

The present invention relates to apparatus for trimming uneven edges from drawn and ironed tubular metal bodies, such as aluminum or steel cans, and more specifically to an improved loading apparatus for supplying containers to the trimming station.

In recent years, a container known as a two-piece container has found a remarkable degree of success in the industry. This container is formed by drawing and ironing a flat metal blank into a tubular body having an end wall integral with one end of the body. An end panel is then connected to the free end of the tubular body.

In the manufacture of this type of container bodies, it is necessary to trim a portion of the free edge of the container body to produce containers of identical size as well as remove the uneven edge resulting from the drawing and ironing operation.

Numerous types of trimming apparatus have been proposed for performing this operation. Examples of such devices are disclosed in U.S. Pat. No. 3,425,251, issued Feb. 4, 1969 and U.S. Pat. No. 3,838,653, issued Oct. 1, 1974.

These trimming machines have found a remarkable degree of commercial success in the industry. In this type of machine, the container bodies are fed onto a mandrel or container supporting member by a plunger that is reciprocated between extreme positions through a cylinder and piston rod assembly. While this type of arrangement has proven successful, the apparatus requires complicated sensing mechanisms and a plurality of valves as well as pneumatic and electronic controls for controlling the movement of the plunger with respect to the remainder of the machine.

In order to simplify the construction and operatopm of this apparatus and reduce the cost of construction and maintenance, it is preferable that some other type of reciprocating mechanism be available. While fully mechanical systems for moving a plunger in a can trimming operation have been proposed, such as shown in U.S. Pat. No. 2,119,942, issued June 7, 1938, these types of units have not found any degree of commercial success because of some inherent problems. The system disclosed in this patent requires a complicated follower mechanism for moving the plunger relative to the frame. In addition, the speed of the unit is of necessity limited because of the large mass which is eccentrically positioned with respect to the drive shaft.

SUMMARY OF THE INVENTION

According to the present invention, a simple and inexpensive loading mechanism for a can trimming machine has been produced which can readily be incorporated into trimming machines with only minor modification and can be driven by the main power source for the trimming machine without any additional electronic or pneumatic controls. The loading mechanism of the present invention consists of a plunger that is guided on a fixed frame for movement between extreme positions. The plunger is moved between the extreme positions by a continuously driven cam that oscillates a shaft between closely spaced angular positions with the shaft having a single arm extending radially therefrom and connected to the plunger through a movable link.

Thus, the entire mechanism can be simply designed and can be operated at any speed due to the small mass which must be moved.

DETAILED DESCRIPTION

Figure 1:
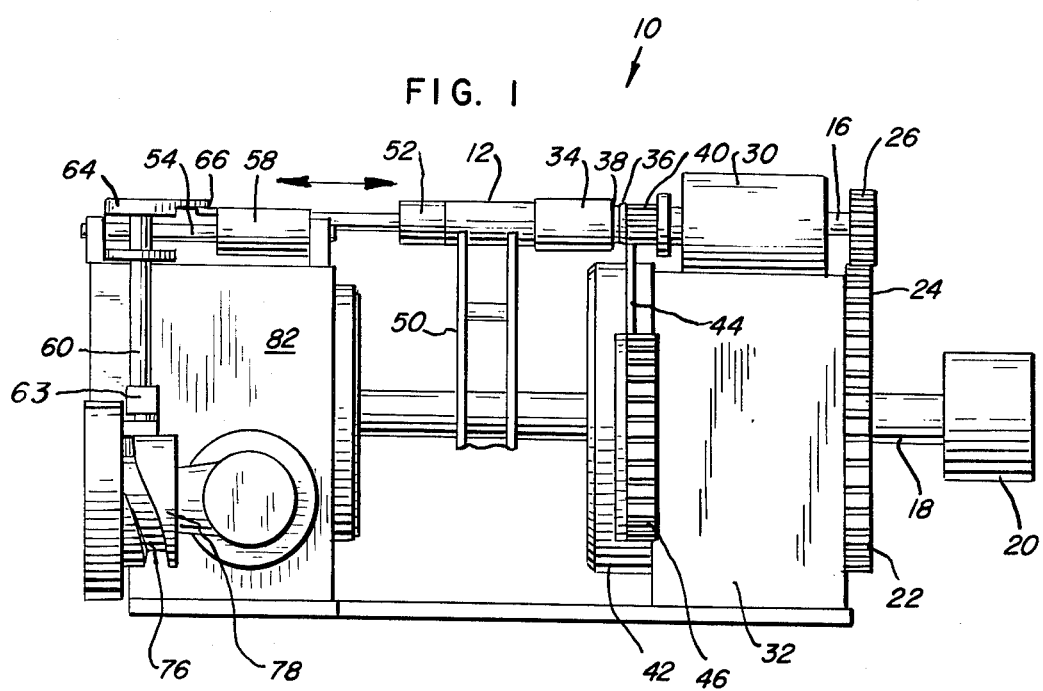
FIG. 1 shows a side elevational view of the trimming apparatus having the loading apparatus of the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings illustrated a trimming apparatus 10 for trimming the rough-uneven edge from a drawn and ironed tubular body 12, such as an aluminum or steel container body that is utilized in forming a two-piece container. Trimming apparatus 10 consists of two substantially parallel shafts including body turning shaft 16 and tool shaft 18. Tool shaft 18 is driven by a suitable motor or drive means 20, such as an electric motor and shaft 16 is driven from shaft 18 through gears 22, 24 and 26.

Shaft 16 is supported in a bearing member 30 carried on machine frame 32 and has a generally cylindrical, rigid body-supporting member or mandrel 34 secured to one end thereof for rotation with shaft 16. A cutting member 36 is also secured to shaft 16 for rotation therewith and is spaced from mandrel or body supporting member 34 by a spacer 38 of reduced diameter to avoid interference with the uneven edge of the tubular metal body being loaded onto support member 30. A knurling or corrugated roll 40 is also fixedly secured to shaft 16 directly adjacent cutter member 36.

Tool supporting shaft 18 has an enlarged wheel or member 42 fixedly secured thereto for rotation therewith. The periphery of wheel or member 42 supports a cutting member or blade sector 44 that cooperates with cutting member 36 to sever the free end portion of container body 12 as will be described later. Rotating wheel or member 42 also has a corrugating and severing member 46 which cooperates with corrugating member 40 and is positioned directly adjacent one end of blade sector 44.

With the apparatus so far described, tool shaft 18 is continuously rotated by motor 20 and gears 22, 24 and 26 drive shaft 16 so that cutting member 36 and blade sector 44 are moved at substantially the same linear velocity. The uneven body edge is thus severed and is in the form of a ring around corrugating roll 40, which is immediately severed by the first and second teeth of corrugating member 46 and then subsequently corrugated by cooperation between corrugating members 40 and 46.

Container bodies 12 are supplied to the mandrel or body supporting member 34 by loading means that include a star wheel 50 that receives container bodies from a source (not shown) and moves them into alignment with mandrel 34. Star wheel 50 is intermittently rotated through well known linkage means (not shown) from shaft 18, such as a Geneva gear, to advance the tubular body into axial alignment with load supporting member 34 and to remove the trimmed container body. When containers 12 are in axial alignment with body supporting member 34, plunger 52 is reciprocated between extreme positions to move a container body 12 from star wheel 50 onto mandrel 34. Plunger 52 has an outer element 53 that is spring biased outward and is freely rotatable on plunger, when holding a container on mandrel 34, to accommodate rotation of the container during the cutting operation.

All of the apparatus so far described is disclosed in U.S. Pat. No. 3,838,653 and the portions of the disclosure of that patent not inconsistent with the present disclosure are incorporated herein by reference.

According to the present invention, the movement of plunger 52 is produced by a completely mechanical mechanism which is driven directly from motor 20 to eliminate the need for any electronic or pneumatic controls.

Figure 2:
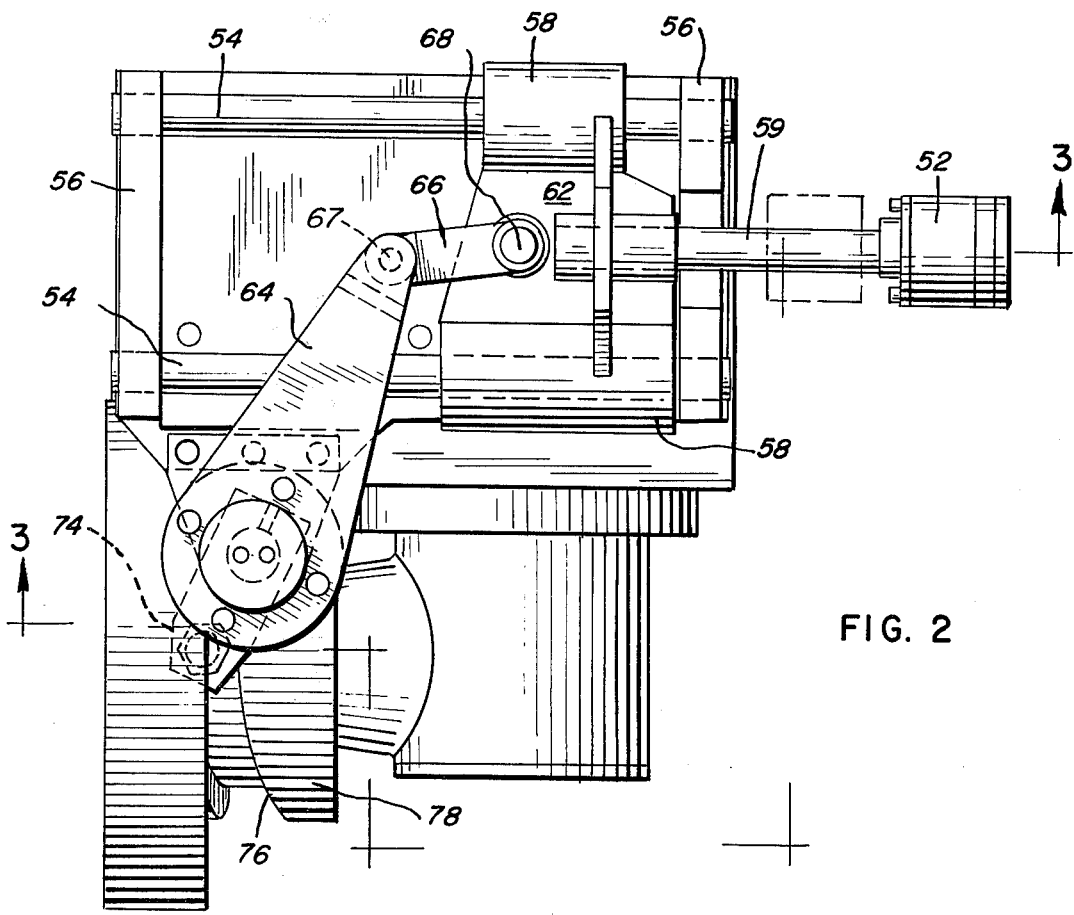
FIG. 2 is a plan view of the loading apparatus of the present invention.
Figure 3:
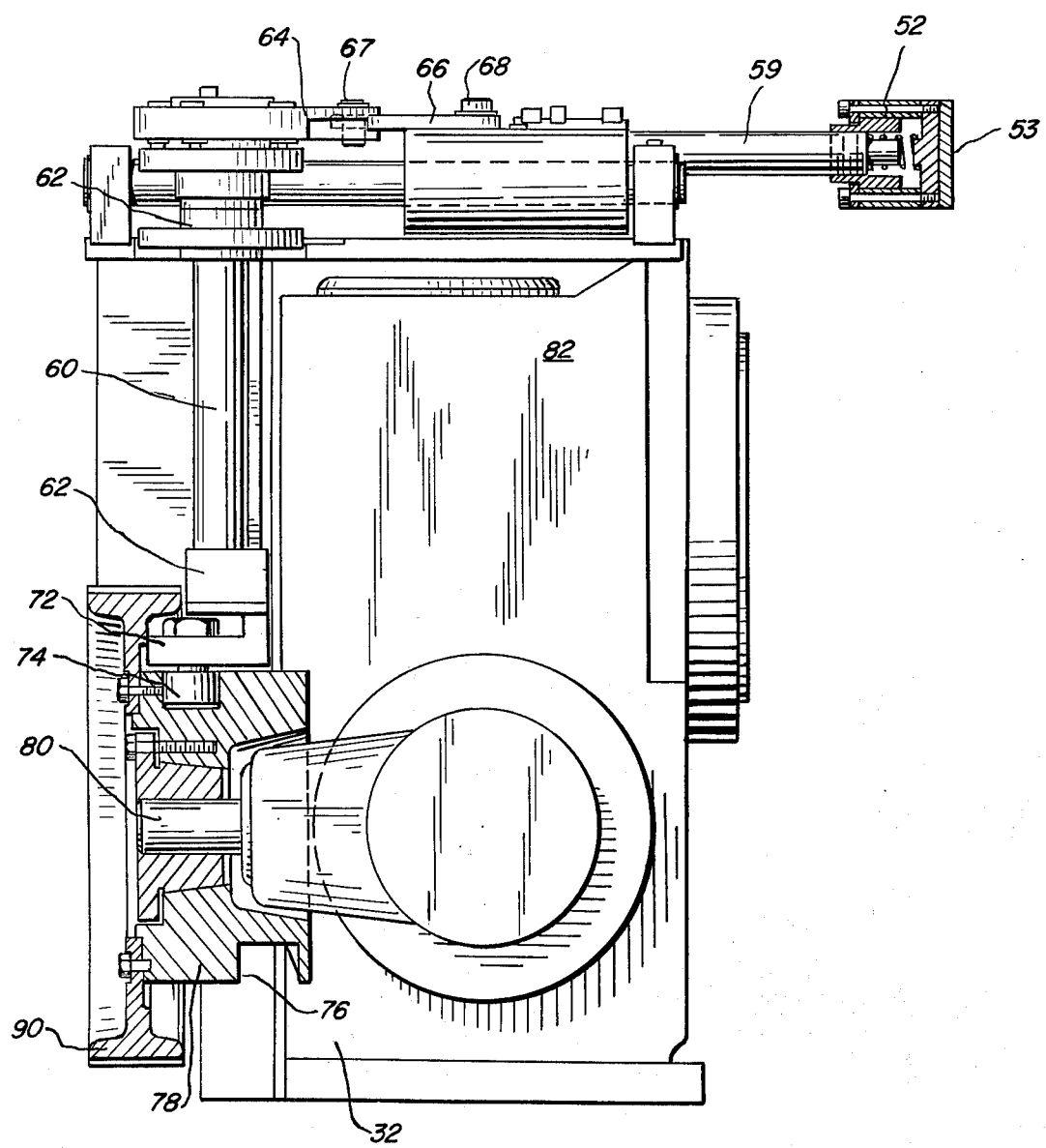
FIG. 3 is an enlarged fragmentary plan view, partially in section, as viewed along line 3—3 of FIG. 2.

As more clearly shown in FIGS. 2 and 3, plunger 52 is reciprocated between the two positions respectively illustrated in solid and dotted lines in FIG. 2 along a path defined by a pair of guide rails 54 that are interposed between plates 56 that form part of frame 32. Plunger 52 has a pair of hubs 58 secured thereto through a rod 59 and bracket structure 62. Hubs 58 are slidably supported on guide rods or guide means 54 so that plunger 52 is reciprocated towards and away from container body supporting member 34.

The moving means for reciprocating plunger 52 includes a loading shaft 60 that is supported on frame 32 by bearings 63. Shaft 60 extends perpendicular to guide means 54 and has an arm 64 extending radially therefrom at the upper free end thereof. Preferably, a ball clutch (not shown) is interposed between arm 64 and shaft 60 to accommodate relative movement when excessive loads are developed, such as occur when a jam is encountered. The outer end of arm 64 is connected to plunger 52 by a link 66 having one end pivotally connected to the outer end of arm 64 by pin 67 and the opposite end pivotally connected to plunger 52 through a pin 68 secured to bracket 62 between hubs 58.

The lower end of shaft 60 has a further or second arm 72 extending radially therefrom with a cam follower 74 secured thereto for free rotation thereon. Cam follower 74 is received in a camming surface 76 defined on a hub or member 78 that is secured to a stub shaft 80. Stub shaft 80 is continuously rotated directly from shaft 18 through suitable gearing (not shown) located within housing 82 that forms part of frame 32. Thus, continuous rotation of member 78 will rotate shaft 60 between two angular extreme positions whereby oscillating the arms 64 between the two positions and reciprocating plunger 52 towards and away from container body supporting member or mandrel 34.

In operation, drive means or motor 20 is actuated to continuously rotate shafts 16 and 18. Container bodies 12 are delivered from a source (not shown) into the pockets of star wheel 50 and star wheel 50 is intermittently acutated to axially align container bodies 12 between mandrel 34 and plunger 52. Camming surface 76 is developed or configured such that plunger 52 is then moved from the dotted-line position of FIG. 2 to the solid-line position to axially shift container bodies 12 onto mandrel 34. The camming surface has a dwell period for holding plunger 52 in its extended solid-line position for a sufficient period of time to remove the edge of container body 12 through cutter means 36 and 44. During this period of time, plunger 52 securely holds container body 12 onto mandrel 34 and rotates therewith.

Thereafter, plunger 52 is returned to its retracted position shown in dotted-line in FIG. 2 and the container body is simultaneously returned to star wheel 50 through the use of pressurized air delivered to mandrel 34 from a source (not shown).

According to one aspect of the invention, the shaft is spaced from the axis of plunger 52 by a substantial distance so that the required rotation of shaft 60 is extremely small between the two extreme angular positions. The degree of rotation is substantially less than 45° and preferably on the order of about 10°. The advantage of such arrangement is that the small amount of rotational movement of shaft 60 allows the mechanism to be operated at very high speeds.

As can be appreciated from the above description, the present loading means incorporates an extremely inexpensive reciprocating mechanism for plunger 52 which eliminates the need for any electronic or pneumatic controls, such as are required when utilizing a fluid cylinder and piston rod arrangement for reciprocating the plunger. Also, the mechanism is designed so that a minimum amount of mass is moved between the extreme positions during the reciprocation of plunger 52 so that the speed of the machine can be substantially higher than presently known mechanical systems.

If desired, a suitable further gear or pulley 90 may be secured to the end of stub shaft 80 for use in driving other mechanisms adjacent the can loading portion of trimmer 10.

What is claimed is:

1. Apparatus for trimming a free edge portion off a container body comprising a frame; a mandrel rotated on said frame for receiving container bodies with cutting means associated with said mandrel for trimming a free edge from the container body; a driven tool shaft extending parallel to said mandrel with drive means between said tool shaft and mandrel to rotate said mandrel; and loading means for supplying container bodies to said mandrel, said loading means including supply means for positioning container bodies in axial alignment with said mandrel, a plunger axially aligned with said mandrel, guide means on said frame for guiding said plunger for movement axially towards and away from said mandrel, a loading shaft rotated about a fixed axis on said frame adjacent said guide means, an arm fixed to said loading shaft and extending radially therefrom, a link interconnecting said arm and said plunger, a continuously rotating member driven by said tool shaft and having a camming surface thereon, and a cam on said loading shaft in engagement with said camming surface for rotating said shaft a limited amount between angular extreme positions that are substantially less than 90° to oscillate said arm between positions and reciprocate said plunger towards and away from said mandrel.

2. Apparatus as defined in claim 1, in which said loading shaft extends perpendicular to said guide means and said arm is fixed to said shaft at one end thereof.

3. Apparatus as defined in claim 2, in which said loading shaft has a second arm secured to the opposite end thereof with said cam freely rotated on said second arm.

4. Apparatus as defined in claim 3, in which said guide means includes a pair of spaced parallel rods and said plunger has a pair of hubs respectively slidably supported on said rods and in which said link has a connection to said plunger between said hubs.

* * * * *